US009945171B2

United States Patent
Sieg

(10) Patent No.: US 9,945,171 B2
(45) Date of Patent: Apr. 17, 2018

(54) SENSOR ASSEMBLY FOR A MOTOR VEHICLE

(71) Applicant: Berthold Sieg, Bottrop (DE)

(72) Inventor: Berthold Sieg, Bottrop (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 113 days.

(21) Appl. No.: 15/041,479

(22) Filed: Feb. 11, 2016

(65) Prior Publication Data

US 2016/0230441 A1    Aug. 11, 2016

(30) Foreign Application Priority Data

Feb. 11, 2015   (DE) .................. 10 2015 101 959
Aug. 18, 2015   (DE) .................. 10 2015 113 663

(51) Int. Cl.
  *G01R 27/26*   (2006.01)
  *E05F 15/73*   (2015.01)
  (Continued)

(52) U.S. Cl.
  CPC .............. *E05F 15/73* (2015.01); *G01D 5/24* (2013.01); *E05F 15/46* (2015.01); *E05Y 2900/50* (2013.01); *G01D 18/00* (2013.01)

(58) Field of Classification Search
  CPC .. G01R 27/26; G01R 27/2605; G01R 31/028; G01R 31/024; G01R 27/2611;
  (Continued)

(56) References Cited

U.S. PATENT DOCUMENTS 5,730,165 A     3/1998   Philipp
6,466,036 B1 *  10/2002  Philipp ................... G01D 5/24
                                                            324/658
(Continued)

FOREIGN PATENT DOCUMENTS

DE          101 31 243 C1    11/2002
DE     10 2006 044 778 A1     3/2008
(Continued)

OTHER PUBLICATIONS

European Search Report of EP 16153207 dated Jun. 16, 2016, 8 pages.

*Primary Examiner* — Thang Le
(74) *Attorney, Agent, or Firm* — Fay Sharpe LLP

(57) ABSTRACT

A sensor device for a motor vehicle including a control and evaluation circuit and at least one sensor electrode coupled therewith, wherein the sensor electrode is designed as a conductor loop, which is coupled to the control and evaluation circuit at two contacts. The control and evaluation circuit has a measurement circuit, which monitors the sensor electrode for capacitance changes. The control and evaluation circuit includes a testing circuit that can be activated intermittently, which tests the integrity of the sensor electrode and its coupling to the control and evaluation circuit. The testing circuit has a triggering mechanism that can be activated in order to intermittently couple a test capacitor to the sensor electrode, such that the measurement circuit also detects the capacitance of the test capacitor in addition to the capacitance of the sensor electrode.

5 Claims, 1 Drawing Sheet

(51) Int. Cl.
*G01D 5/24* (2006.01)
*G01D 18/00* (2006.01)
*E05F 15/46* (2015.01)

(58) Field of Classification Search
CPC .......... H03K 2217/9401; H03K 2217/960705;
H03K 2217/960725; H03K 2217/960715;
G06F 3/0416; G06F 3/044; G06F 3/0412;
G06F 2203/04101; G06F 2203/04104;
G06F 2203/04106
USPC .......... 324/658, 678, 686, 382, 548
See application file for complete search history.

(56) References Cited

U.S. PATENT DOCUMENTS

| | | | |
|---|---|---|---|
| 9,250,757 B2 * | 2/2016 | Roziere | G06F 3/044 |
| 9,304,156 B2 * | 4/2016 | Weingaertner | B60R 25/2054 |
| 2005/0068712 A1 * | 3/2005 | Schulz | E05B 81/78 |
| | | | 361/287 |
| 2006/0033507 A1 * | 2/2006 | Gaumel | B60N 2/002 |
| | | | 324/658 |
| 2008/0278453 A1 * | 11/2008 | Reynolds | G01D 3/08 |
| | | | 345/173 |
| 2011/0221459 A1 * | 9/2011 | Uno | B60N 2/002 |
| | | | 324/713 |
| 2013/0234733 A1 * | 9/2013 | Lange | B60R 25/2045 |
| | | | 324/658 |

FOREIGN PATENT DOCUMENTS

| | | |
|---|---|---|
| DE | 10 2012 022 927 A1 | 5/2014 |
| DE | 10 2012 111 447 A1 | 5/2014 |
| DE | 10 2014 101 775 A1 | 8/2014 |
| DE | 10 2013 105 539 A1 | 12/2014 |
| EP | 0518 836 A1 | 12/1992 |
| EP | 1 339 024 A2 | 8/2003 |
| EP | 1 339 025 A2 | 8/2003 |
| WO | WO 2008/137980 A1 | 11/2008 |
| WO | WO 2013/182464 A1 | 12/2013 |

\* cited by examiner

SENSOR ASSEMBLY FOR A MOTOR VEHICLE

BACKGROUND

The invention relates to a sensor assembly for a motor vehicle. In particular, the invention relates to a sensor device having a control and evaluation device, and at least one sensor electrode coupled to this control and evaluation device. The sensor electrode is preferably designed as a conductor loop or as a coaxial cable, which is coupled to the control and evaluation circuit. The control and evaluation circuit has a measuring circuit, which monitors the sensor electrode for capacitance changes.

Sensor assemblies of the type specified above are used in the field of vehicle engineering in order to detect an approach of objects and to design a more comfortable operation of the vehicle.

In particular, sensor devices of this type, with capacitive electrode loops, are used in the rear region of a vehicle. If the sensor electrode extends over a region of the vehicle rear, then a user can trigger an opening of the hatch through merely approaching the sensor device, or executing a gesture in the detection region of the sensor device, for example. During this process, when a user desire has been detected, the identity of the user is queried prior to an opening, which user normally carries a wireless radio key for a wireless querying of the identification.

Circuits and solutions for capacitive sensors on vehicles are available in the market, which enable capacitance detection at variously designed sensor electrodes. By way of example, the change to the capacitance of a sensor electrode is detected in that the sensor electrode is repeatedly coupled to an operating voltage at a defined frequency, and the charging and discharging process is evaluated with regard to a capacitance change. Methods of this type are known, for example, from U.S. Pat. No. 5,730,165. Another capacitive sensor is known from EP 1 339 025 B1.

Some of the known sensor assemblies have a more complex construction, e.g. they are constructed with so-called guard electrodes, and if applicable, with separate ground electrodes, in addition to the sensor electrode. This serves to adjust the detection range of the sensor electrode to the desired operating region as precisely as possible. Relevant disclosures are, by way of example, EP 0 518 836 A1, DE 101 31 243 C1, or DE 10 2006 044 778 A1.

One problem with the known sensor assemblies is, both with the initial installment, and the initial start-up, as well as during long-term operation, ensuring that there is a proper coupling of the sensor electrode to the control and evaluation circuit. With looped sensor electrodes that are coupled to the control and evaluation circuit at two pickup points, e.g. at both ends, a continuity test, for example, is carried out, in order to verify that the sensor electrode is coupled to the control and evaluation circuit such that it can make measurements. This approach is not precise and reliable enough in the framework of available measurement precisions and components.

The object of the invention is to provide an improved and universal sensor assembly, which enables a reliable checking of an integrity of the entire assembly.

BRIEF SUMMARY

This object is achieved in accordance with the invention by a sensor assembly having the features of claim 1.

The sensor device according to the invention also has a testing circuit that can be activated at least periodically, in addition to the measurement circuit. This testing circuit is then always employed when the proper connection of the sensor electrode to the control and evaluation circuit is to be verified. This can occur at each start-up of the vehicle, or in defined intervals, or with other triggering events.

The testing circuit serves to test the integrity of the sensor electrode and its proper coupling to the control and evaluation circuit. This is implemented by the testing circuit in that a test capacitance in the control and evaluation device is intermittently coupled to the sensor electrode by means of a controllable triggering mechanism, which can be activated inside the control and evaluation device.

If the test capacitor is coupled to the sensor electrode, this then has the effect of causing the measuring circuit coupled to the sensor electrode, which detects the capacitance of the sensor electrode, to detect the capacitance of the test capacitor in addition to the actual sensor electrode capacitance. The measured capacitances with coupled and decoupled test capacitors thus differ significantly. By way of example, a loop end of the sensor electrode may be potential-free for this in the sensor device according to the invention during the measurement operation, while the activity of the testing circuit, however, is coupled to the ground via a test capacitor.

It has proven to be the case that the connection of a defined test capacitance, in the range of a few pF for example, causes very defined and readily detectable changes in the capacitance values. Because the measuring circuit is coupled, on one side of the conductor loop, with the sensor electrode, and is coupled to the testing circuit on the other side, in particular at the other, outermost end of the sensor electrode, the defined change in the measurement value provides a clear indication that the sensor electrode is not compromised in terms of its integrity over its entire length. If this were not the case, the connection of the test capacitor at the other end would cause no change in the measurement value in the measurement circuit.

Both the measurement circuit as well as the testing circuit are located in the control and evaluation device, and a particularly reliable integrity check is therefore possible when the capacitor is connected thereto, with which measurement values from the measurement circuit can be correlated. For a successful testing of the connections, and the integrity of the sensor electrode, it is necessary that when the capacitor is connected thereto, or the capacitor is disconnected therefrom, a significant capacitance change is detected by the measurement circuit. If the sensor electrode is interrupted in sections, for example, as may occur due to an accident, or due to fatigue, the connecting of the test capacitor would cause no substantial change in the capacitance. In this case, the result of the integrity test would be negative.

The other components of the control and evaluation device may be designed such that they activate the testing circuit on one hand, and they carry out the correlation of the measurement values from the measurement circuit with the connection states of the testing circuit on the other hand.

In an alternative design, a coaxial conductor configuration is used as the sensor electrode. Instead of a conductor loop, the coaxial conductor configuration (e.g. a conventional coaxial cable) can be coupled to the control and evaluation device.

In a preferred design, the test capacitor is formed by a defined capacitance, e.g. a capacitor having a capacitance of 0.5 pF-10 pF. It is not necessary to use test capacitors with greater precision, because the critical factor is the capacitance change, and not an absolute capacitance value.

The testing circuit preferably has a second triggering mechanism, which enables a discharging of the testing circuit to the ground when the test capacitor is decoupled from the sensor electrode.

The discharging of the test capacitor between the times in which the test capacitor is coupled to the sensor electrode ensures that at any time, similar charging states of the test capacitor are present with the sensor electrode, and therefore reproducible conditions are ensured.

It is particularly advantageous when the test capacitor is repeatedly coupled to the sensor electrode in accordance with a timing schedule stored in the control and evaluation device. Based on the stored timing schedule, which assigns triggering procedures to certain time intervals, the testing circuit knows, on one hand, when the test capacitor is to be coupled to the sensor electrode, and, on the other hand, the control and evaluation device can determine with greater certainty whether the connection of the electrode to the control and evaluation circuit and the electrode integrity are ensured. The measurement values are then correlated with the same timing schedule, and it is then checked whether the measurement values change in accordance with the same timing schedule in which the capacitor is coupled to the sensor electrode. The repeated and distinct adherence to the timing schedule results in a particular reliability of the functionality testing.

In a preferred design of the invention, the sensor electrode takes the form of a conductor loop, which is accommodated and guided in a flexible plastic profile. The guidance of the conductor loop with a plastic profile, in particular a flexible rubber profile, is advantageous, because the sensor electrode is retained with its loop-shape in a defined form and orientation by this means. By way of example, the plastic profile may have a central supporting wall, and accommodating spaces on both sides of the supporting wall. The input (the first half) of the conductor loop is accommodated in one of the accommodating spaces, and the return (the second half) of the conductor loop is accommodated on the other side of the supporting wall. In this manner, a respective half of the conductor loop is accommodated in a respective half of the separating wall, and the halves are guided in parallel. The transition region in the middle of the conductor loop can be exposed, or it can also be protected.

BRIEF DESCRIPTION OF THE DRAWINGS

The invention shall now be explained in greater detail based on the attached drawings.

DETAILED DESCRIPTION

Figure 1:
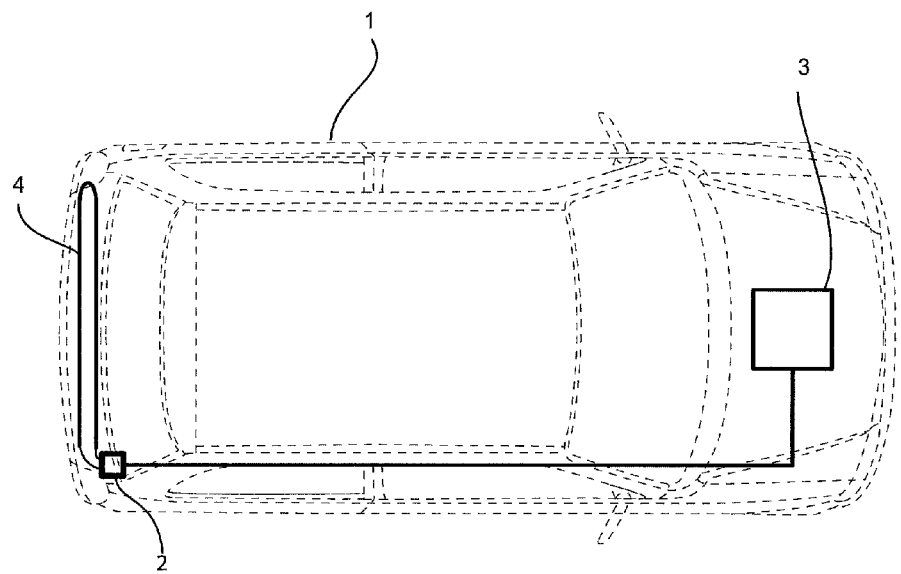
FIG. 1 shows, schematically, the arrangement of one embodiment of the sensor device according to the invention on a vehicle.

A vehicle 1 is shown in FIG. 1. A control and evaluation device 2 is disposed in the rear of the vehicle, which is connected to a central control system 3 of the vehicle via a wiring harness. A loop-shaped sensor electrode 4 is connected to the control and evaluation device 2. The sensor electrode 4 extends in an elongated shape along the rear bumper of the vehicle. The loop is elongated thereby, such that the input and return of the sensor electrode run substantially parallel, aside from the transition region in the middle of the sensor electrode.

The control and evaluation device 2 is decentralized in this example, disposed on one side of the vehicle.

Figure 2:
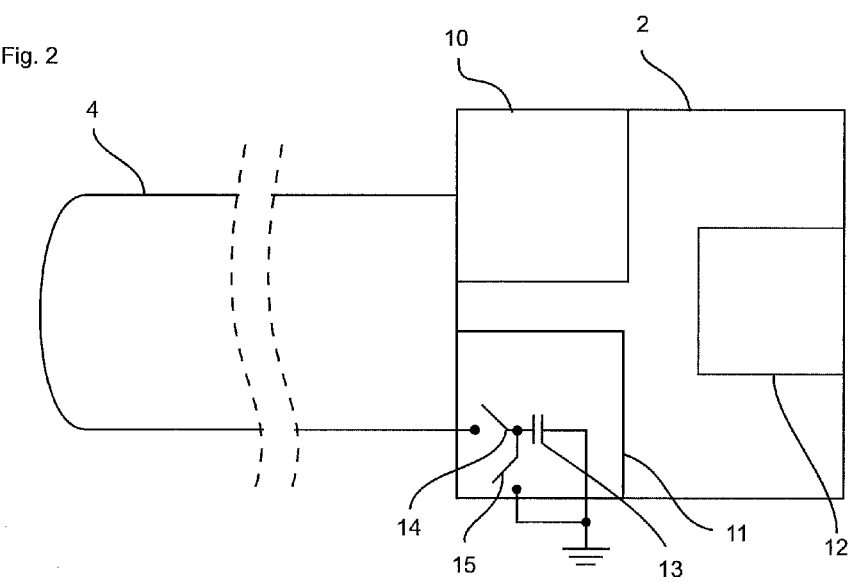
FIG. 2 shows, schematically, the construction of the control and evaluation device.

FIG. 2 shows the control and evaluation device 2 and the sensor electrode 4 coupled thereto in a schematic depiction. The sensor electrode 4 is shown in an abbreviated form, indicated by the interrupted region in the middle of the sensor electrode.

The control and evaluation circuit has a measurement circuit 10. Furthermore, a testing circuit 11 is provided. The evaluation unit 12 receives signals from the measurement circuit 10 and can cause the testing circuit 11 to switch to the test mode.

The lower end of the sensor electrode 4 is potential-free (floating) in the depicted configuration. In this design, the measurement circuit 10 can detect capacitance changes at the sensor electrode 4, occurring in relation to a measurement element or the rest of the environment. For this, a known circuit for capacitance detection (see above) is, used in the measurement circuit 10. In this exemplary embodiment, the measurement circuit 10 repeatedly charges the sensor electrode 4 at a predefined potential, and accumulates a charge that is a measure for the capacitance of the sensor electrode 4. The capacitance value is determined by the measurement circuit 10, and is transmitted to the evaluation circuit 12 inside the control and evaluation device 2. This evaluates the intermittently arriving capacitance values, in order to detect operating procedures, and to transmit operating signals to the central control unit 3. Strong changes in the capacitance indicate that a user is approaching, or that a gesture is executed toward the sensor electrode, signalizing an operating desire. The evaluation circuit 12 can evaluate the temporal course of the capacitance changes with stored courses and according to criteria that are sufficiently described in the prior art. The actual type of detection of an operation is of no substantial importance for this invention, however. The important thing for the invention is that the testing circuit 11 can couple the end of the sensor electrode 4 that is depicted as floating in FIG. 1 to a test capacitor 13 against the ground. In this case, the capacitance of the sensor electrode 4 changes abruptly, which is detected by the measurement circuit 10, and thus also by the evaluation circuit 12. The coupling with the test capacitor 13 occurs via a switch 14, which is disengaged or engaged by the testing circuit. An engagement or disengagement occurs according to a timing schedule, and a time sequence encoded therein, which is stored in the control and evaluation circuit 2. If the testing circuit 11 is thus activated for executing the test procedure by the evaluation circuit 12, then an engagement to, or disengagement from, the sensor electrode 4 by the capacitor 13 occurs in defined time intervals.

By way of example, the capacitor 13 is engaged for 2 ms, then disengaged for 10 ms, subsequently re-engaged for 15 ms, and then disengaged for 30 ms, before it is again engaged for another 20 ms, and then disengaged on a long-term basis. This timing schedule is likewise known, or can be accessed, in the evaluation circuit 12, and the evaluation circuit 12 compares the measurement values received by the measurement circuit 10, with respect to the characteristic changes, with the defined timing schedule. If the measurement values correlate to the stored timing schedule, it is then clear that the effects of the capacitor 13 have traveled over the entire path of the electrode 4 to the measurement circuit 10. This type of testing, regarding a proper contacting of the sensor electrode 4 with the device 2 is substantially more reliable than a continuity test or a measurement of the ohmic resistance, for example. This is because, in particular, the measurement circuit 10 is configured for detecting small capacitance changes, and detects said changes with extremely great precision. The measurement circuit functions in both the measurement mode as well as in the testing mode in the same manner, because constantly it detects capacitance values.

It is possible to then always discharge the test capacitor 13, when the switch 14 disengages the test capacitor 13 from the sensor electrode 13, via a triggering mechanism 15. As a matter of course, the switch 15 must then again be disengaged before the switch 14 is engaged for a coupling of the capacitor 13 thereto.

The invention claimed is:

1. A sensor device for a motor vehicle, comprising a control and evaluation circuit and a sensor electrode coupled therewith,
   wherein the sensor electrode is designed as a conductor loop, which is coupled at two contacts to the control and evaluation circuit,
   wherein the control and evaluation circuit includes a measurement circuit, which is designed such that the measurement circuit monitors capacitance changes at the sensor electrode,
   wherein the control and evaluation circuit includes a testing circuit that can be activated intermittently, which tests the integrity of the sensor electrode and its coupling to the control and evaluation circuit, wherein the testing circuit has a triggering mechanism that can be activated in order to intermittently couple a test capacitor to the sensor electrode, such that the measurement circuit also detects the capacitance of the test capacitor in addition to the capacitance of the sensor electrode, wherein the measurement circuit is coupled to the sensor electrode at one end thereof, and the testing circuit is coupled to the sensor electrode at the other end thereof.

2. The sensor device according to claim 1, wherein the test capacitor is formed by a capacitor component.

3. The sensor device according to claim 1, wherein the testing circuit includes a second triggering mechanism, by means of which the test capacitor can be coupled to ground in order to discharge it.

4. The sensor device according to claim 1, wherein the testing circuit of the test capacitor is repeatedly coupled intermittently to the sensor electrode according to a timing schedule stored in the control and evaluation circuit, and is intermittently decoupled from the sensor electrode, wherein the capacitance values measured by the measurement circuit when the testing circuit is active are examined in the control and evaluation circuit for correlation with the stored timing schedule.

5. The sensor device according to claim 1, wherein the sensor electrode is designed as a conductor loop, which is accommodated and guided in a flexible plastic profile.

* * * * *